United States Patent
Dryfoos et al.

(10) Patent No.: US 10,216,753 B2
(45) Date of Patent: *Feb. 26, 2019

(54) DATA FRAGMENTATION TUNING AND CANDIDACY PERSISTENCE

(71) Applicant: International Business Machines Corporation, Armonk, NY (US)

(72) Inventors: Robert O. Dryfoos, New Canaan, CT (US); James V. Farmer, Wappingers Falls, NY (US); Bradd A. Kadlecik, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/204,244

(22) Filed: Jul. 7, 2016

(65) Prior Publication Data

US 2016/0314137 A1 Oct. 27, 2016

Related U.S. Application Data

(63) Continuation of application No. 14/043,868, filed on Oct. 2, 2013, now Pat. No. 9,436,696.

(51) Int. Cl.
*G06F 17/30* (2006.01)

(52) U.S. Cl.
CPC .. *G06F 17/30138* (2013.01); *G06F 17/30135* (2013.01); *G06F 17/30303* (2013.01)

(58) Field of Classification Search
CPC .............................................. G06F 17/30135
See application file for complete search history.

(56) References Cited

U.S. PATENT DOCUMENTS

| | | | |
|---|---|---|---|
| 6,571,261 B1 * | 5/2003 | Wang-Knop | G06F 3/0601 |
| 7,487,105 B2 * | 2/2009 | Jacobs | G06Q 10/02 |
| | | | 705/7.19 |
| 7,562,203 B2 | 7/2009 | Scott et al. | |
| 7,921,103 B2 | 4/2011 | Olston et al. | |
| 8,051,115 B2 | 11/2011 | Biller | |
| 8,190,811 B2 | 5/2012 | Moon et al. | |
| 8,244,992 B2 | 8/2012 | Spackman | |

(Continued)

OTHER PUBLICATIONS

Amer et al., "A Heuristic Approach to Re-Allocate Data Fragments in DDBSs", 2012 International Conference on Information Technology and e-Services, 2012 IEEE.

(Continued)

*Primary Examiner* — Taelor Kim
(74) *Attorney, Agent, or Firm* — Michael A. Petrocelli (57) ABSTRACT

A method for implementing defragmentation of a data area is provided. The method includes receiving a data change event for the data area and determining, whether the data area has exceeded a defragment threshold based on a defragment threshold value. The method may further include adding the data area to a candidacy list when the data area is determined to have exceeded the defragment threshold based on the defragment threshold value. The method may also include defragmenting the data area when the data area is determined to have exceeded the defragment threshold based on the defragment threshold value and removing the data area from the candidacy list following the determination.

10 Claims, 4 Drawing Sheets

(56) References Cited

U.S. PATENT DOCUMENTS

| | | | |
|---|---|---|---|
| 8,990,477 B2 * | 3/2015 | Parker | G06F 12/0246 |
| | | | 711/103 |
| 2004/0148476 A1 * | 7/2004 | Altare | G06F 3/0613 |
| | | | 711/159 |
| 2007/0088912 A1 * | 4/2007 | Mukherjee | G06F 3/061 |
| | | | 711/112 |
| 2008/0177994 A1 * | 7/2008 | Mayer | G06F 9/4418 |
| | | | 713/2 |
| 2009/0254594 A1 * | 10/2009 | Burchall | G06F 17/30442 |
| 2011/0099326 A1 | 4/2011 | Jung et al. | |
| 2011/0225164 A1 | 9/2011 | Narasayya et al. | |
| 2012/0284474 A1 | 11/2012 | Lehr et al. | |
| 2012/0303918 A1 | 11/2012 | Reed et al. | |
| 2013/0254458 A1 * | 9/2013 | Pittelko | G06F 12/02 |
| | | | 711/103 |
| 2015/0095292 A1 | 4/2015 | Dryfoos et al. | |

OTHER PUBLICATIONS

Benkrid et al., "A Combined Selection of Fragmentation and Allocation Schemes in Parallel Data Warehouses", 19th International Conference on Database and Expert Systems Application, pp. 370-374, 2008 IEEE, DOI 10.1109/DEXA.2008.63.

* cited by examiner

FIG. 4

DATA FRAGMENTATION TUNING AND CANDIDACY PERSISTENCE

FIELD OF THE INVENTION

The present invention relates generally to the field of computing and more particularly to the defragmentation of data areas.

BACKGROUND

Currently in computing, data fragmentation is a common phenomenon when storage of a fixed size is used for data fragments of varying sizes. As data fragments are added and deleted from the storage areas, the storage space may become fragmented with areas of unused space existing between areas of in use space. As time progresses, these storage areas typically may become more fragmented requiring more storage than what would logically be needed. As such, the difference between the logical storage requirement and the physical storage usage may then determine the amount of fragmentation that exists.

To rectify this problem, an expensive operation is typically needed to compact or defragment the storage (i.e., data) area, removing all the empty spaces. However, due to the expense of performing the defragmentation operation, it is not desirable to perform the defragmentation operation often.

Furthermore, current methods of defragmentation merely try to defragment any space that can be defragmented without determining which storage areas need to be defragmented. Additionally, these methods of defragmentation typically involve a search for items to defragment. As such, this may be an input/output (I/O) intense process depending on the size and scope of the search for fragmented data areas. Therefore, the performance benefits of defragmenting frequently accessed data areas may be compromised.

SUMMARY

A processor-implemented method for implementing a first manager and a second manager for defragmenting a data area is provided. The method may include receiving, by the first manager, a data change event for the data area and determining, by the first manager, based on the occurrence of the data change event, whether a data area has exceeded the defragment threshold based on a defragment threshold value. The method may further include adding the data area to a candidacy list, by the first manager, when the data area is determined to have exceeded the defragment threshold based on the defragment threshold value and determining, by the second manager, whether the data area has exceeded the defragment threshold based on the defragment threshold value. The method may also include defragmenting the data area, by the second manager, when the data area is determined to have exceeded the defragment threshold based on the defragment threshold value and removing the data area, by the second manager, from the candidacy list following the determination.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing and more particularly to the defragmentation of data areas. The following described exemplary embodiments provide a system, method and program product for implementing a defragmentation threshold value associated with a data area based on a defragmentation assessment of the data area at the time the data area is changed.

In the maintenance of file systems, defragmentation is a process that reduces the amount of fragmentation. Defragmentation physically organizes the contents of the mass storage device used to store files into the smallest number of contiguous regions (fragments). Defragmentation also attempts to create larger regions of free space using compaction to impede the return of fragmentation.

As previously described, expensive methods exist to compact or defragment the storage (i.e., data) area, removing all the empty spaces. However, due to the expense of performing the defragmentation operation, it is not desirable to perform the defragmentation operation often. Also, there may be different degrees of fragmentation. For example, having many small data fragments of varying size may cause much less fragmentation problems then having many large data fragments of varying sizes. As a result, some areas may be frequently updated and trying to defragment those areas may cause additional work with very little benefit.

Furthermore, the current methods of defragmentation try to defragment any space that can be defragmented without determining which storage areas need to be defragmented. Additionally, current methods involving defragmentation typically involve a search for items to defragment. As such, this may be an input/output (I/O) intense process depending on the size and scope of the search for fragmented data areas. This may be particularly problematic for data areas that may be frequently accessed during all hours in a global economy since the additional load on the system to perform this type of search may result in this type of search to be performed less often. As such, the performance benefits of defragmenting those frequently accessed data areas may be compromised.

According to at least one embodiment of the present invention, a defragmentation threshold value may be utilized on a data area basis that may allow for some areas to be designated as more highly fragmented than others and as a result not cause additional overhead of defragmenting less fragmented data areas. This threshold value may further be adjusted and changed dynamically between each data area defragmentation operation. As such, data fragmentation tuning may be performed through modification of the defragmentation threshold value on a data area basis. Data fragmentation tuning may be performed by collecting information pertaining to how often a particular data area is read as opposed to written to, added to, or deleted from. Additionally, information may also be ascertained between each defragmentation interval in order to determine how often a particular data area is defragmented and an average size of the data fragments associated with a data area. This is particularly advantageous in reducing the amount of time defragmentation process takes in addition to reducing the unavailability of data areas due to defragmentation actually taking place at a particular time.

In accordance with at least one embodiment of the present invention, the location of data areas is examined at the time of a change to determine if defragmentation may be beneficial at that particular time of change. Therefore, no additional search would be needed to be performed at a later time, since a record (i.e., a candidacy list) of these data areas concerning whether they require defragmentation may be kept. As a result, defragmentation may be performed more often without having to incur an expensive search for fragmented data areas.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following described exemplary embodiments provide a system, method and program product for implementing and recording a defragmentation threshold value associated with a data area based on a defragmentation assessment of the data area at the time the data area is changed. Additionally, embodiments of the present invention may ensure performance gain by re-assessing and defragmenting only the data areas that have been recorded as possible candidates for defragmentation based on the data area's associated defragmentation threshold value.

According to at least one embodiment of the present invention, a defragmentation threshold value may be utilized on a data area basis that may allow for some areas to be designated as more highly fragmented than others and as a result not cause additional overhead of defragmenting less fragmented data areas. The defragmentation threshold value may be defined by the user as a percentage representing desired utilization. For example, in one implementation of the present embodiment, the user may specify 30% as the defragment threshold value. As such, the data area may consist of up to 30% of unused space before being a candidate for defragmentation. According to one implementation of the present invention, the amount of fragmentation (i.e., a defragmentation threshold value or fragmentation factor) may be added as a defragmentation threshold value to a set of pre-existing properties that define each data area. When defragmentation is performed, a defragmentation manager may access these properties to determine if the logical data size with the fragmentation factor is large enough to benefit from being defragmented at this time.

Furthermore, in accordance with an embodiment of the present invention, the location of data areas may be examined by a data change event manager at the time of a data change to a data area to determine if that data area may be a candidate for defragmentation. As such, whenever the logical size of a data area is modified, a check may be performed by the data change event manager to determine if defragmentation would be beneficial by comparing the physical size of the data area versus the logical size of the data area since the difference between the logical storage requirement and the physical storage usage may then determine the amount of fragmentation that exists (i.e., an average size of data fragments associated with a data area). The logical size of a data area may not always match the physical size. If the logical size is smaller then it may not be beneficial to defragment the data area. This is just one of the criteria that may be used to determine the defragmentation threshold value for that area.

According to one implementation of the present invention, a candidacy list or record may be stored with a reference to the data areas that may benefit from defragmentation. As such, no search would have to be done prior to the defragmentation process to determine which data areas require defragmentation. Conversely, the list may be accessed by a defragmentation manager at the time of defragmentation and those areas on the list may be defragmented without the necessity of an intensive I/O search process.

Figure 1:
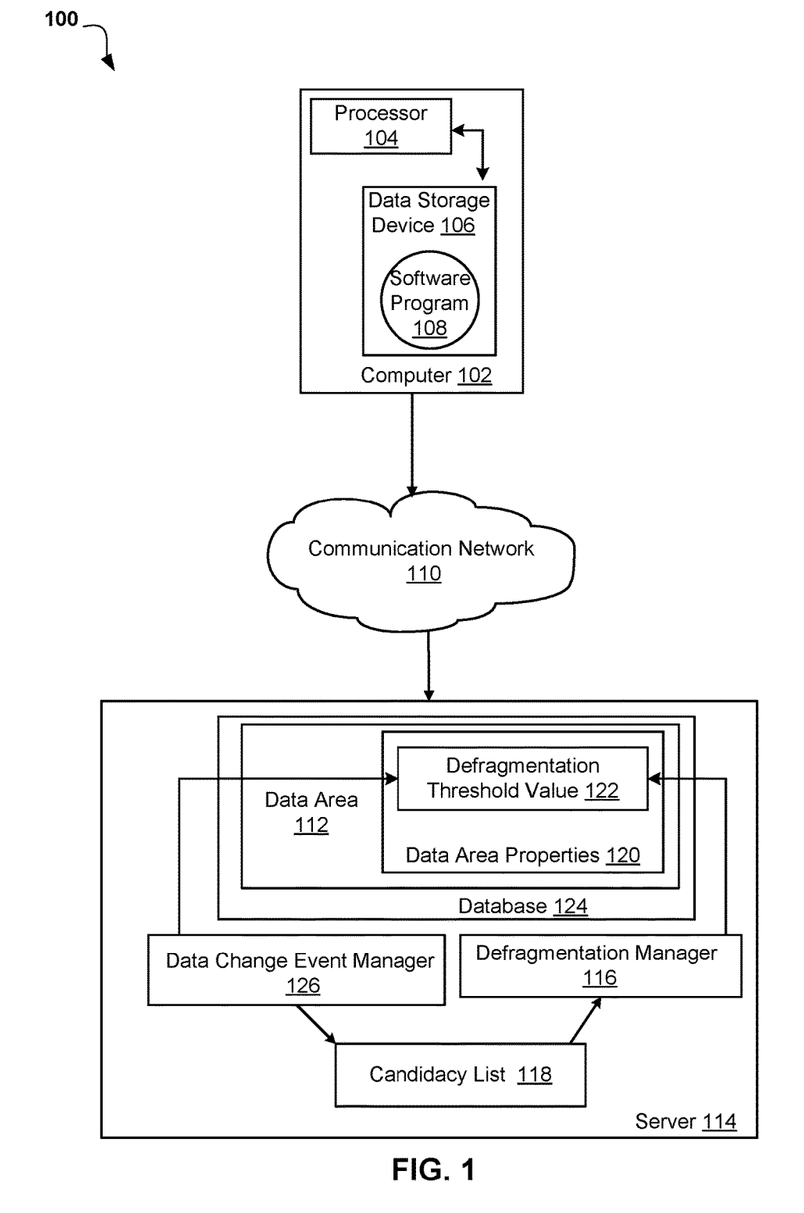
FIG. 1 illustrates the hardware that may be used in a networked computer environment with an exemplary data change event manager and a defragmentation manager according to one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108. The networked computer environment 100 may also include a server 114 that is enabled to run a defragmentation manager 114 and a data change event manager 126. The defragmentation manager 114 and the data change event manager may interact with a database 124 and a communication network 110. The database 124 may have a data area 112 and may have data area properties 120.

The networked computer environment 100 may include a plurality of computers 102 and servers 114 and a plurality of data areas, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with database 124 running on server computer 114 via the communications network 110. The communications network 110 may include connections, such as wire, wireless communication links, or fiber optic cables. As will be discussed with reference to FIG. 4, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database.

As previously described, the client computer 102 may access data area 112 of database 124, running on server computer 114 via the communications network 110. For example, a user using an application program 108 running on a client computer 102 may connect via a communication network 110 to data area 112 of database 124 which may be running on server 114. Additionally, the data change event manager 126 may record a defragmentation threshold value 122 (i.e., threshold value) that may be stored with the data area properties 120 of data area 112. The defragmentation threshold value 122 may be implemented on data areas 112 allowing for some data areas 112 to be designated as more highly fragmented than other data areas 112 and as a result not cause additional overhead of defragmenting less fragmented data areas 112. The defragmentation threshold value 122 may further be adjusted and changed dynamically between each data area 112 defragmentation operation. The defragmentation threshold value 122 may be ascertained by the defragmentation manager 116. The data change event manager 126 may collect information pertaining to how often a particular data area 112 is changed (i.e., read as opposed to written to, added to, or deleted from). Additionally, information may also be ascertained by the data change event manager 126 (FIG. 1) between each defragmentation interval in order to determine how often a particular data area 112 is defragmented.

According to one implementation of the present embodiment, the location of data areas 112 may be examined by the data change event manager 126 at the time of a data area 112 change to determine if defragmentation would be beneficial at that particular time of change. As such, no additional search may be needed to be performed at a later time to determine if a data area 112 is a good candidate for defragmentation. Additionally, a candidacy list 118 may be stored by a data change event manager 126 on server 114. The candidacy list 118 may include a list of all the data areas 112 that may benefit from defragmentation. The data change event manager process is explained in more detail below with respect to FIG. 2. The defragmentation manager 116 process is explained in more detail below with respect to FIG. 3.

Figure 2:
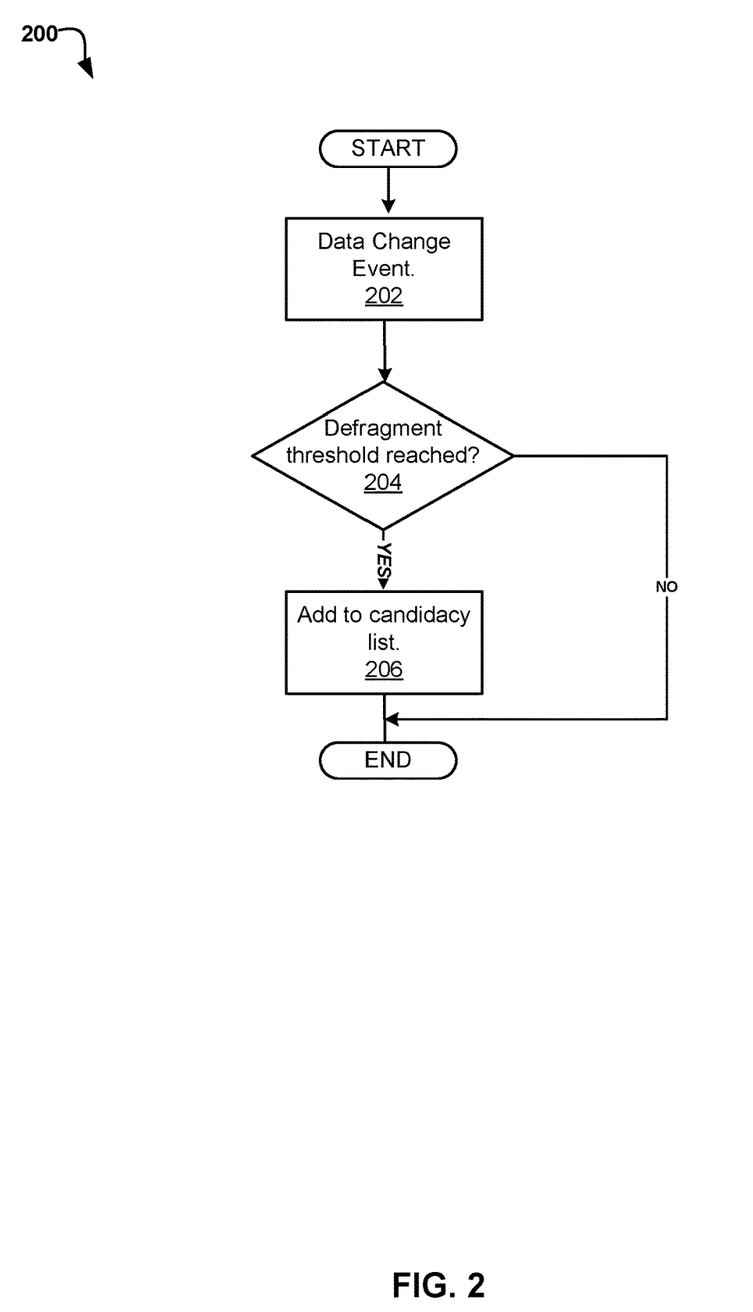
FIG. 2 is an operational flowchart illustrating the steps carried out by a data change event manager according to one embodiment.

Referring now to FIG. 2, an operational flowchart illustrating the steps carried out by a data change event manager according to one embodiment is depicted. As previously described, a data change event manager 126 (FIG. 1) may examine the location of data areas 112 (FIG. 1) at the time of a data change, for example, a data add, write or delete (as opposed to a data read or access) to a data area 112 (FIG. 1) to determine if that data area 112 (FIG. 1) may be a candidate for defragmentation. As such, whenever the logical size of a data area 112 (FIG. 1) is modified, a check may be performed by the data change event manager 126 (FIG. 1) to determine if defragmentation would be beneficial by comparing the physical size of the data area versus the logical size of the data area 112 (FIG. 1). According to one implementation of the present invention, a candidacy list 118 (FIG. 1) may be stored with a reference to the data areas 112 (FIG. 1) that may benefit from defragmentation. As such, no search would have to be done prior to the defragmentation process to determine which data areas require defragmentation. Conversely, the list may be accessed by a defragmentation manager (described later with respect to FIG. 3) at the time of defragmentation and those areas on the list may be defragmented without the necessity of an intensive I/O search process.

At 202, a data change event occurs. For example, the data area 112 (FIG. 1) is written to, added to or deleted from as opposed to read or accessed. Then at 204, the defragmentation threshold is checked. The defragmentation threshold value 122 (FIG. 1) for that specific data area 112 (FIG. 1) is used to determine the defragment threshold. The defragment threshold value may be used to compute the maximum amount of resource that would be used (i.e., the defragment threshold). For example purposes only, the following may be defined:

B=logical size of the data area
N=number of physical blocks in use
P=defragment threshold value
M=defragment threshold
At data change time (i.e., data change event), M may be calculated as the following:

$$M=B/((1-P)*\text{physical block size})$$

Once M, is computed, then M may be compared to N to determine if the current utilization is greater than or less than the maximum fragmentation utilization as provided by the defragment threshold. Since M must be a whole number, the ceiling(M) may be used which would convert any fraction of M to the smallest integer not less than M. Therefore, for a data area 112 (FIG. 1) to be a candidate for defragmentation, the following must be true:

Ceiling(M)<N

If the number of physical blocks in use is greater than the number that would be in use with the maximum amount of allowable fragmentation, then the data area 112 (FIG. 1) maybe a candidate for defragmentation.

If at 204, (based on the analysis previously described) it is determined that the data area is a candidate for defragmentation, then the data area is added to a candidacy list 118 (FIG. 1) at 206. The candidacy list 118 (FIG. 1) may be examined at a later time rather than performing an exhaustive search to determine which data areas 112 (FIG. 1) are potential candidates for defragmentation. As previously explained, the candidacy list 118 (FIG. 1) may include a list of all the data areas 112 that may benefit from defragmentation at a later time (e.g. a scheduled time). This may be beneficial since the data areas 112 (FIG. 1) are not being automatically defragmented at the time of change, but rather the data areas 112 (FIG. 1) may be evaluated at the time of a change to be defragmented at a later time. For example, it may have less impact on the system to schedule a defragmentation time that is not during peak time, but rather during system down time. Then the scheduled defragmentation may be performed without the necessity of an extensive I/O search process and without impacting system performance. Furthermore, the candidacy list 118 (FIG. 1) may useful in determining how many data areas 112 (FIG. 1) may need to be defragmented. The candidacy list 118 (FIG. 1) may also aide in estimating the amount of time that may be needed to defragment the data areas and in deciding the best time to schedule the defragmentation.

If at 204, it is determined (based on the analysis previously described) that the data area is not a candidate for defragmentation, then the data area is not added to the candidacy list 118 (FIG. 1). The examination of the candidacy list 118 (FIG. 1) is explained in more detail below with respect to FIG. 3.

Figure 3:
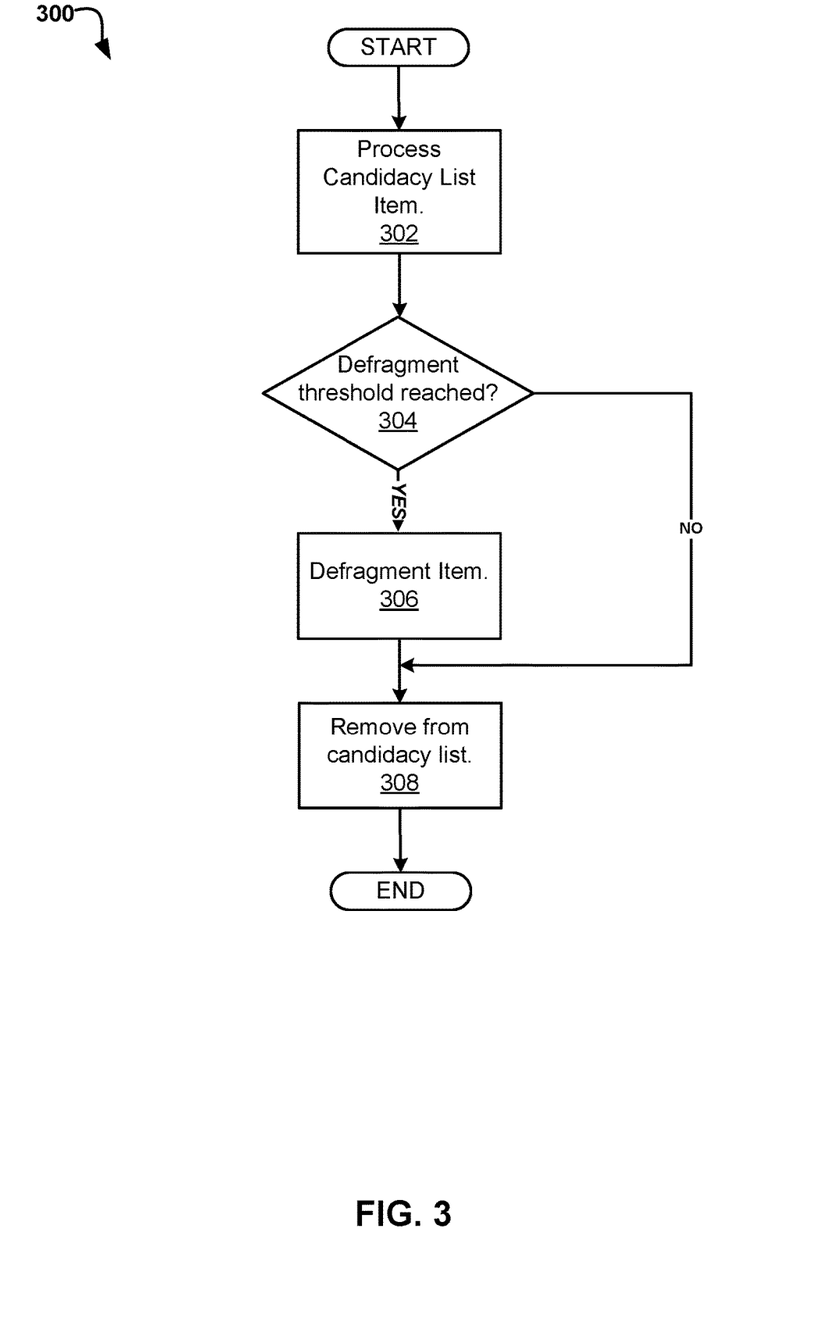
FIG. 3 is an operational flowchart illustrating the steps carried out by a defragmentation manager according to one embodiment.

Referring now to FIG. 3, an operational flowchart illustrating the steps carried out by a defragmentation manager is depicted. As previously explained with respect to FIG. 2, the method may be implemented by providing a candidacy list 118 (FIG. 1) that may be stored with a reference to the data areas 112 (FIG. 1) that may benefit from defragmentation at a later time. As such, no search would have to be done prior to the defragmentation process to determine which data areas require defragmentation. Conversely, the list may be accessed by a defragmentation manager 116 (FIG. 1) at the time of defragmentation and the defragmentation threshold value 122 (FIG. 1) of those data areas 112 (FIG. 1) on the list may be re-examined. If the data area has exceeded the defragment threshold based on the defragment threshold value then the data areas 112 (FIG. 1) may be defragmented without the necessity of an intensive I/O search process.

At 302, an item on the candidacy list 118 (FIG. 1) may be processed by the defragmentation manager 116 (FIG. 1). For example, defragmentation may be scheduled every night during an off-peak time and before the actual defragmentation occurs, the candidacy list 118 (FIG. 1) may be processed by the defragmentation manager 116 (FIG. 1). The defragmentation manager 116 (FIG. 1) may process each item on the candidacy list 118 (FIG. 1) and at 304, the defragmentation threshold value 122 (FIG. 1) is re-assessed and it is determined whether the data area has exceeded the defragment threshold based on the defragment threshold value. According to one implementation, defragmentation threshold value 122 (FIG. 1) may manually be changed to result in either more or less defragmentation candidates.

If at 304, it is determined that the data area 112 (FIG. 1) has exceeded the defragment threshold based on the defragment threshold value then the data area 112 (FIG. 1) remains on the candidacy list 118 (FIG. 1) and is defragmented at 306 and then removed from the candidacy list 18 (FIG. 1) at 308.

If at 304, it is determined that the data area 112 (FIG. 1) has not exceeded the defragment threshold based on the defragment threshold value (FIG. 1) then the data read 112 (FIG. 1) is not defragmented and the data area 112 (FIG. 1) is removed from the candidacy list 118 (FIG. 1) at 308.

Figure 4:
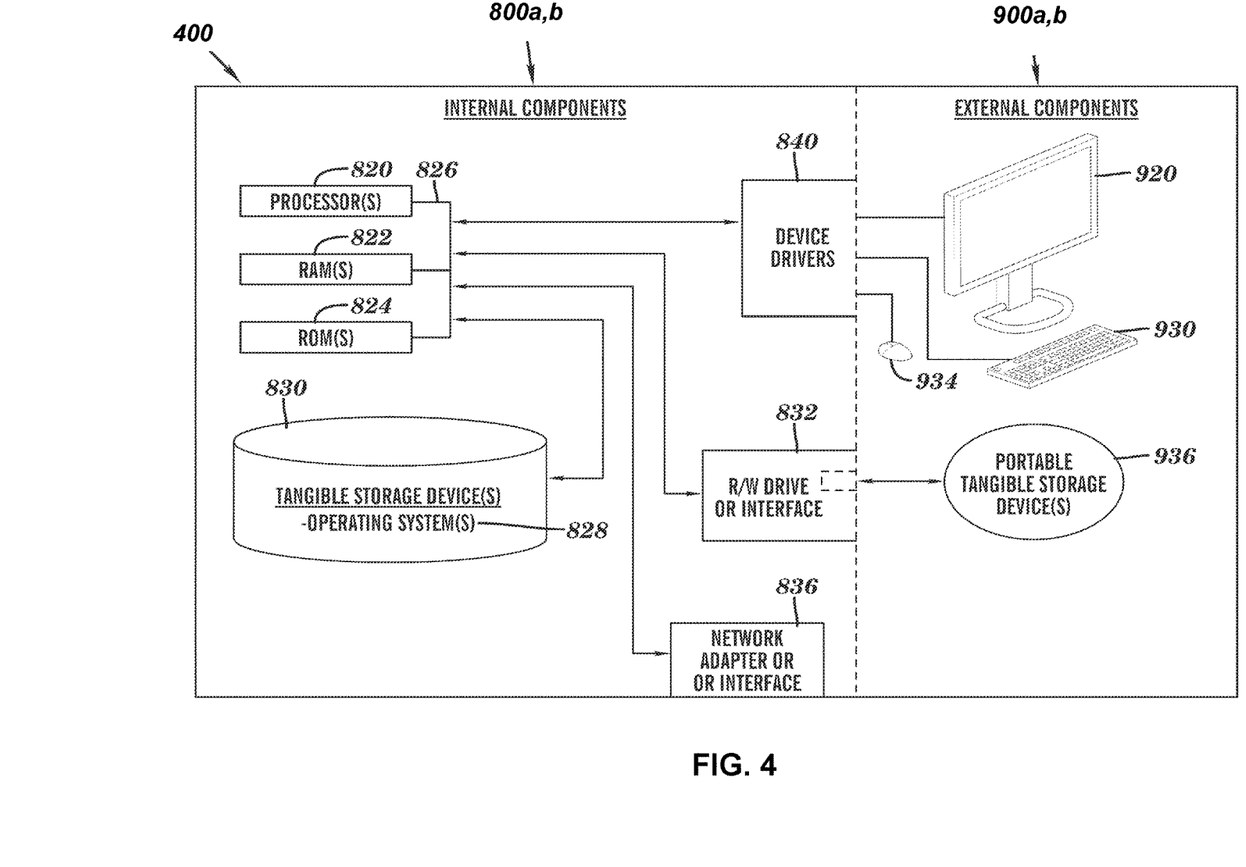
FIG. 4 is a block diagram of internal and external components of computers and servers depicted in FIG. 1.

FIG. 4 is a block diagram of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server computer 114 (FIG. 1) include respective sets of internal components 800a, b and external components 900a, b illustrated in FIG. 3. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and software program 108 (FIG. 1) in client computer 102 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program 108 can be stored on one or more of the respective portable computer-readable tangible storage devices 936, read via the respective R/W drive or interface 832 and loaded into the respective hard drive 830.

Each set of internal components 800a, b also includes network adapters or interfaces 836 such as a TCP/IP adapter cards, wireless wi-fi interface cards, or 3G or 4G wireless interface cards or other wired or wireless communication links. A software program 108 in client computer 102 can be downloaded to client computer 102 from an external computer via a network (for example, the Internet, a local area network or other, wide area network) and respective network adapters or interfaces 836. From the network adapters or interfaces 836, the software program 108 in client computer 102 is loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for implementing a first manager and a second manager for defragmenting a data area comprising:

determining, by the first manager, based on an occurrence of a data change event for the data area, whether the data area has exceeded a defragment threshold based on a defragment threshold value, wherein the defragment threshold value is a pre-determined number that has been added to a set of pre-existing properties that define the data area, wherein the set of pre-existing properties dynamically change based on a defragmentation tuning that modifies the defragment threshold value based on a frequency of a plurality of changes associated with the data area, the defragmentation tuning comprising a collection of information including, but not limited to, how often the data area is read, how often the data area is written to, how often the data area is added to, how often the data area is deleted from, how often the data area is defragmented, and an average size of data fragments associated with the data area, wherein determining the data area has exceeded the defragment threshold comprises calculating a logical size of the data area, calculating a number of physical blocks in use, calculating the defragment threshold value, and calculating the defragment threshold, wherein calculating the defragment threshold comprises:
calculating the defragment threshold at a time associated with the occurrence of the data change event by subtracting the calculated defragment threshold value from 1 to compute a first answer,
multiplying the computed first answer by a physical block size to compute a second answer, and
dividing the calculated logical size of the data area by the computed second answer to obtain the calculated defragment threshold;

adding the data area to a candidacy list, by the first manager, in response to determining the data area exceeded the defragment threshold, such that defragmentation is performed more often based on the candidacy list without conducting extensive searches for fragmented data areas;

determining, by the second manager, whether the data area has exceeded the defragment threshold based on the defragment threshold value;

defragmenting, by the second manager, only the data area added to the candidacy list and determined by the second manager to have exceeded the defragment threshold without defragmenting less fragmented data areas; and removing the data area, by the second manager, from the candidacy list following the determination.

2. The method of claim 1, wherein determining the data area has exceeded the defragment threshold comprises:
comparing the calculated defragment threshold to the calculated number of physical blocks in use.

3. The method of claim 1, wherein obtaining the calculated defragment threshold further comprises:
determining if the calculated defragment threshold is equal to a whole number; and
in response to determining the calculated defragment threshold is not equal to a whole number, converting a fraction associated with the calculated defragment threshold to a smallest integer not less than the calculated defragment threshold.

4. The method of claim 1, wherein the data change event comprises at least one of a write to, addition to, or delete from, the data area.

5. The method of claim 1, wherein the defragmentation tuning comprises modification of the defragment threshold value on a data area basis.

6. A system for implementing a first manager and a second manager for defragmenting a data area, the system comprising:

a memory device;
an output device; and
a processing unit in communications with the memory device and the output device, wherein the system is configured to perform a method comprising:

determining, by the first manager, based on an occurrence of a data change event for the data area, whether the data area has exceeded a defragment threshold based on a defragment threshold value, wherein the defragment threshold value is a pre-determined number that has been added to a set of pre-existing properties that define the data area, wherein the set of pre-existing properties dynamically change based on a defragmentation tuning that modifies the defragment threshold value based on a frequency of a plurality of changes associated with the data area, the defragmentation tuning comprising a collection of information including, but not limited to, how often the data area is read, how often the data area is written to, how often the data area is added to, how often the data area is deleted from, how often the data area is defragmented, and an average size of data fragments associated with the data area, wherein determining the data area has exceeded the defragment threshold comprises calculating a logical size of the data area, calculating a number of physical blocks in use, calculating the defragment threshold value, and calculating the defragment threshold, wherein calculating the defragment threshold comprises:
calculating the defragment threshold at a time associated with the occurrence of the data change event by subtracting the calculated defragment threshold value from 1 to compute a first answer,
multiplying the computed first answer by a physical block size to compute a second answer, and
dividing the calculated logical size of the data area by the computed second answer to obtain the calculated defragment threshold;

adding the data area to a candidacy list, by the first manager, in response to determining the data area exceeded the defragment threshold, such that defragmentation is performed more often based on the candidacy list without conducting extensive searches for fragmented data areas;

determining, by the second manager, whether the data area has exceeded the defragment threshold based on the defragment threshold value;

defragmenting, by the second manager, only the data area added to the candidacy list and determined by the second manager to have exceeded the defragment threshold without defragmenting less fragmented data areas; and removing the data area, by the second manager, from the candidacy list following the determination.

7. The system of claim 6, wherein determining the data area has exceeded the defragment threshold comprises:
comparing the calculated defragment threshold to the calculated number of physical blocks in use.

8. The system of claim 6, wherein obtaining the calculated defragment threshold further comprises:
determining if the calculated defragment threshold is equal to a whole number; and
in response to determining the calculated defragment threshold is not equal to a whole number, converting a fraction associated with the calculated defragment threshold to a smallest integer not less than the calculated defragment threshold.

9. The system of claim 6, wherein the data change event comprises at least one of a write to, addition to, or delete from, the data area.

10. The system of claim 6, wherein the defragmentation tuning comprises modification of the defragment threshold value on a data area basis.

\* \* \* \* \*